Nov. 15, 1960 O. W. SEPP, JR 2,960,296
PARACHUTE OPENING INDUCER
Filed April 11, 1958
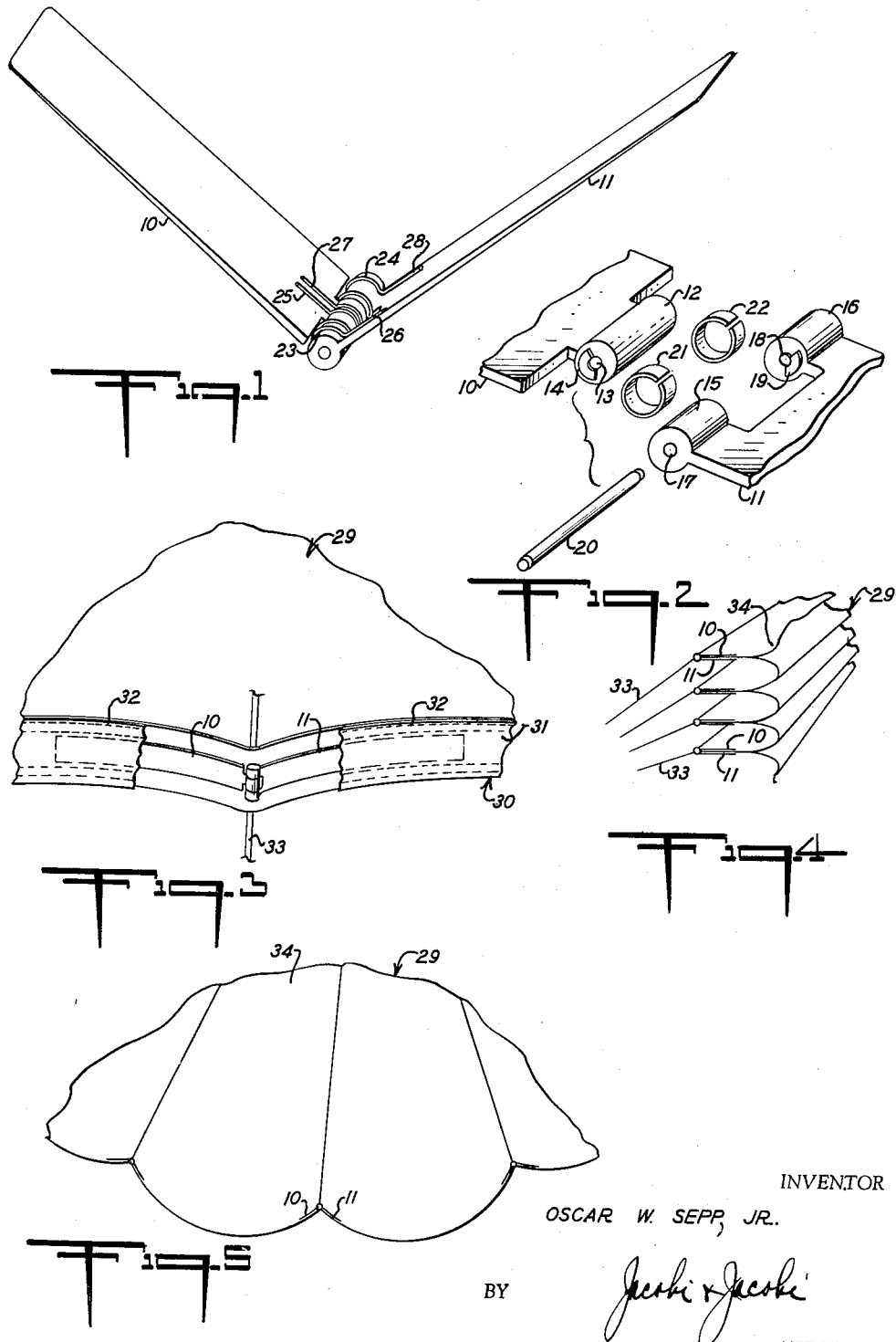
INVENTOR
OSCAR W. SEPP, JR.
BY *Jacobi & Jacobi*
ATTORNEYS

United States Patent Office 2,960,296
Patented Nov. 15, 1960

2,960,296

PARACHUTE OPENING INDUCER

Oscar W. Sepp, Jr., Dayton, Ohio, assignor to M. Steinthal & Co., Inc., New York, N.Y., a corporation of New York Filed Apr. 11, 1958, Ser. No. 727,849

3 Claims. (Cl. 244—149)

This invention relates to aeronautics and more particularly to an apparatus for mechanically opening a parachute canopy immediately upon deployment thereof in order to facilitate full and immediate inflation of such canopy.

While present day parachutes are remarkably efficient and foolproof, nevertheless, there are isolated instances of failure of the parachute to open and occasionally for one or more reasons, the opening of the parachute is delayed which in the event of low altitude operations may be disastrous. In the case of parachutes utilized as personnel safety equipment or for the delivery of airborne troops, obviously it is essential that there be no parachute failure or undue delay in opening which might result in the loss of human life. In the case of equipment delivery or missile recovery, it is essential from a monetary standpoint that the parachute operate without fail. Parachutes are also frequently used as a decelerating means during the landing of aircraft, and in this application it is essential that the parachute open immediately upon deployment in order to provide the desired decelerating force.

It is accordingly an object of the invention to provide a parachute opening inducer which may be incorporated in conventional parachutes to provide a mechanical means for partially opening the canopy upon deployment thereof in order to facilitate inflation of such canopy.

A further object of the invention is the provision of a parachute opening inducer, including mechanical means for partially opening the canopy of the parachute upon deployment thereof and which inducer may be utilized in any desired type or size of parachute.

A still further object of the invention is the provision of a parachute opening inducer which may be incorporated in a conventional parachute to provide mechanical means for partially opening the canopy of the chute upon deployment to facilitate inflation thereof and which will in no way interfere with the normal function or operation of the parachute.

Another object of the invention is the provision of a parachute opening inducer which is relatively simple in construction and which may be conveniently and economically constructed from readily available materials and incorporated in conventional parachutes.

Further objects and advantages of the invention will be apparent from the following description taken in conjunction with the accompanying drawing wherein:

Fig. 1 is a view in perspective showing a parachute opening inducer constructed in accordance with this invention and in a partially open position;

Fig. 2 a fragmentary exploded perspective view to an enlarged scale and showing the details of the hinge connection between the two blades of the inducer;

Fig. 3 a fragmentary perspective view showing the manner of incorporating the parachute opening inducer of this invention in the skirt of a parachute canopy;

Fig. 4 a fragmentary perspective view showing a folded or packed parachute and the position occupied by the opening inducer of this invention with the parachute in such condition; and Fig. 5 a fragmentary perspective view showing a parachute canopy in open condition and the position occupied by the parachute opening inducers of this invention.

With continued reference to the drawing there is shown a parachute opening inducer constructed in accordance with this invention and which may well comprise a pair of hingedly connected oppositely extending blades 10 and 11 which may be formed of metal, plastic or any other suitable material. As clearly shown, the blades 10 and 11 are generally rectangular in configuration and tapered in thickness from the inner end outward. While a rectangular tapered configuration is shown, it is to be understood that the blades 10 and 11 may be of other configurations and also that the same might be formed of wire to provide a skeleton framework and also the blades might be straight or tapered to a different degree in order to provide the desired curvature conforming to the curvature of the parachute canopy when in open condition.

As best shown in Figs. 1 and 2, blade 10 may be provided at the inner end thereof with an enlarged transverse bearing member 12 provided with a bore 13 extending therethrough and on each end of the bearing member 12 there may be provided an abutment 14, the purpose and operation of which will be later described.

The inner end of blade 11 is provided with spaced aligned transverse bearing lugs 15 and 16 having bores 17 and 18 extending therethrough in alignment and on the inner ends of each bearing lug 15 and 16 is stop means 19 designed to cooperate with the abutments 14 on the bearing member 12 in a manner to be presently described.

The bearing member 12 on the blade 10 is received between the bearing lugs 15 and 16 on the blade 11 and the blades 10 and 11 are hingedly connected together by a hinge pin 20 extending through the bores 17, 13 and 18 in the bearing lugs 15 and 16 and the bearing member 12. In this relationship it will be seen that the blades 10 and 11 may be pivotally moved with respect to each other and such pivotal movement will be limited by engagement of the stop means 19 on the bearing lugs 15 and 16 with the abutments 14 on the bearing member 12 and such stop means and abutments may be so proportioned as to permit the desired pivotal movement of the blades 10 and 11 relative to each other. The spaces between the outer ends of the bearing member 12 and the inner ends of the bearing lugs 15 and 16 and the stop means and abutment means may be enclosed by a housing comprising split rings 21 and 22 which are positioned over these parts and closed after insertion of the hinge pin 20 in the aligned bores. These split rings 21 and 22 prevent the entry of foreign material into the space between the bearing member 12 and the bearing lugs 15 and 16 thereby precluding interference with full pivotal movement of the blades 10 and 11 relative to each other.

In order to bias the blades 10 and 11 toward outward position as shown in Fig. 1, there may be provided a pair of coil springs 23 and 24 surrounding the split rings 21 and 22 respectively and the coil spring 23 may have oppositely extending ends 25 and 26 engaging the blades 10 and 11 respectively while the coil spring 24 may be provided with oppositely extending ends 27 and 28 also engaging the blades 10 and 11 respectively. Consequently, it will be seen that the device operates somewhat in the manner of a screen door hinge, except that the springs 23 and 24 urge the blades 10 and 11 toward open position rather than toward closed position and while two such springs have been shown, it is to be understood that a single spring or other equivalent resilient means may be employed for this purpose.

While any desired number of parachute opening inducers constructed in accordance with this invention may be installed in a parachute, normally such inducers will be installed in the skirt of the parachute in each shroud line and as shown in Fig. 3, the canopy 29 of the parachute terminates at the outer edge in a skirt 30 having a portion turned back to form a hem 31 and as clearly shown in this figure, the blades 10 and 11 are enclosed by the hem 31 and secured in place by stitching 32 extending through the hem 31 and skirt 30 of the canopy 29. The shroud line 33 is in alignment with the pivotal connection between the blades 10 and 11 and consequently, upon folding of the parachute for packing purposes as shown in Fig. 4, the panels 34 of the canopy 29 are folded into superimposed position and the blades 10 and 11 of each opening inducer are folded or closed into super-imposed position to permit packing of the parachute in a suitable bag or receptacle.

Upon deployment of the parachute from the bag or other receptacle, the springs 23 and 24 will immediately urge the blades 10 and 11 outwardly and partially open the canopy of the parachute as shown in Fig. 5, whereupon the inflation of the parachute canopy is materially facilitated since the entry of air thereto is substantially unimpeded. It is to be noted, that as shown in Fig. 5, the blades 10 and 11 assume the curvature of each panel 34 of the parachute canopy 29 and as stated above, the blades 10 and 11 may be of such a configuration as to adapt themselves to the curvature or size of any particular parachute. Also the opening movement of the blades 10 and 11 may be controlled by the design of the abutments 14 and stop means and for any particular parachute the inducers will all open substantially the same degree thereby providing the proper configuration to the parachute canopy prior to inflation thereof.

It will be seen that by the above described invention there has been provided a relatively simple, yet highly effective means for mechanically opening a parachute upon deployment thereof in order to facilitate entry of air into the parachute canopy to complete the slow inflation thereof.

It will be obvious to those skilled in the art that various changes may be made in the invention without departing from the spirit and scope thereof and therefore the inventoin is not limited by that which is shown in the drawing and described in the specification, but only as indicated in the appended claims.

What is claimed is:

1. A parachute opening inducer comprising a pair of oppositely extending hingedly connected blades, each blade being generally rectangular and tapered in thickness from the inner end outward, spaced aligned transverse bearing lugs on the inner end of one blade, a transverse bearing member on the inner end of the other blade disposed between said lugs, a hinge pin extending through said lugs and member, an abutment on opposite ends of said member, stop means on the inner end of said lugs for engaging said abutments to limit relative pivotal movement of said blades, a housing for each abutment and stop means comprising a split ring enclosing the space between the inner end of each lug and the adjacent end of said member and a coil spring surrounding each ring with opposite ends of each spring engaging said blades to bias said blades toward open position, whereby upon securing said blades to the skirt of a parachute, said blades may be folded for packing said parachute and upon deployment of said parachute said blades will move to open position to partially open the skirt of the parachute and facilitate inflation.

2. A parachute opening inducer comprising a pair of oppositely extending hingedly connected blades, spaced aligned transverse bearing lugs on the inner end of one blade, a transverse bearing member on the inner end of the other blade disposed between said lugs, a hinge pin extending through said lugs and member, an abutment on opposite ends of said member, stop means on the inner ends of said lugs for engaging said abutments to limit relative pivotal movement of said blades, a housing for each abutment and stop means comprising a split ring enclosing the space between the inner end of each lug and the adjacent end of said member and a coil spring surrounding each ring with opposite ends of each spring engaging said blades to bias said blades toward open position, whereby upon securing said blades to the skirt of a parachute said blades may be folded for packing said parachute and upon deployment of said parachute said blades will move to open position to partially open the skirt of the parachute and facilitate inflation.

3. A parachute opening inducer comprising a pair of oppositely extending hingedly connected blades, spaced aligned bearing lugs on the inner end of one blade, a bearing member on the inner end of the other blade disposed between said lugs, a hinge pin extending through said lugs and member, an abutment on said member, stop means on said lugs for engaging said abutment to limit relative pivotal movement of said blades, a housing for said abutment and stop means comprising a split ring enclosing the same and a coil spring surrounding said ring with opposite ends of said spring engaging said blades to bias said blades toward open position, whereby upon securing said blades to the skirt of a parachute said blades may be folded for packing said parachute and upon deployment of said parachute said blades will move to open position to partially open the skirt of the parachute and facilitate inflation.

References Cited in the file of this patent

UNITED STATES PATENTS

| | | |
|---|---|---|
| 1,200,585 | Chambers | Oct. 10, 1916 |
| 1,341,794 | El Vean | June 1, 1920 |
| 1,682,509 | Hardwick | Aug. 28, 1928 |
| 2,362,488 | Jahn | Nov. 14, 1944 |
| 2,405,356 | Jahn | Aug. 6, 1946 |